Oct. 8, 1929.  A. E. ZOLLER ET AL  1,730,797

ELECTRIC MOTOR SPEED CONTROL

Filed May 11, 1928

Inventor
Albert E. Zoller and
Claud L. Fulghum
By Grant F. Crampton
Attorney

Patented Oct. 8, 1929

1,730,797

UNITED STATES PATENT OFFICE

ALBERT E. ZOLLER AND CLAUD L. FULGHUM, OF TIFFIN, OHIO, ASSIGNORS TO QUINCY ELEVATOR GATE COMPANY, OF TIFFIN, OHIO, A CORPORATION OF ILLINOIS

ELECTRIC-MOTOR SPEED CONTROL

Application filed May 11, 1928. Serial No. 276,946.

Our invention has for its object to provide a mechanical speed control for electric motors whereby the speed of the motor may be automatically varied at desired points in its operations, and which enables, if desired, the elimination of rheostats and other like electric appliances commonly used for varying the speed of electric motors. Constructions containing our invention may be connected directly to the motor shaft. Also, the invention may be contained in, or form a part of, the motor assembly and thus the invention may constitute a motor construction, or single power producing or translating instrumentality, that will automatically reduce its speed at adjustable rates and, if desired, stop the motor at desired points in the movement of the elements actuated by the motor. Or, if desired, switches that control the circuit of the motor may be so located as to be operated to open the circuit when the speed of the motor and the element operated by the motor has become reduced to a desired slow rate. The invention may be used for actuating a member that is designed to move predetermined distances at a relative rapid rate and wherein it is advantageous to start or finish, or both start and finish, such movements at reduced rates of velocity, such as to slowly start and increase its rate to a high point and maintain its rate at this high point and subsequently reduce its rate and, if desired, bring it to a stop. The invention is particularly advantageous when used for reciprocably moving bodies that are to be moved from and to definite points, such as opening and closing sliding doors.

The invention may be contained in structures of different forms, and may be used for operating various devices and elements that accomplish a great variety of purposes and perform different functions. To illustrate a practical application of the invention, we have selected a construction embodying a combined motor and motor control and shall describe them hereinafter. The motor and its control mechanism are shown in the accompanying drawings as applied to a set of vertical shiftable elevator shaft doors.

Figure 1:
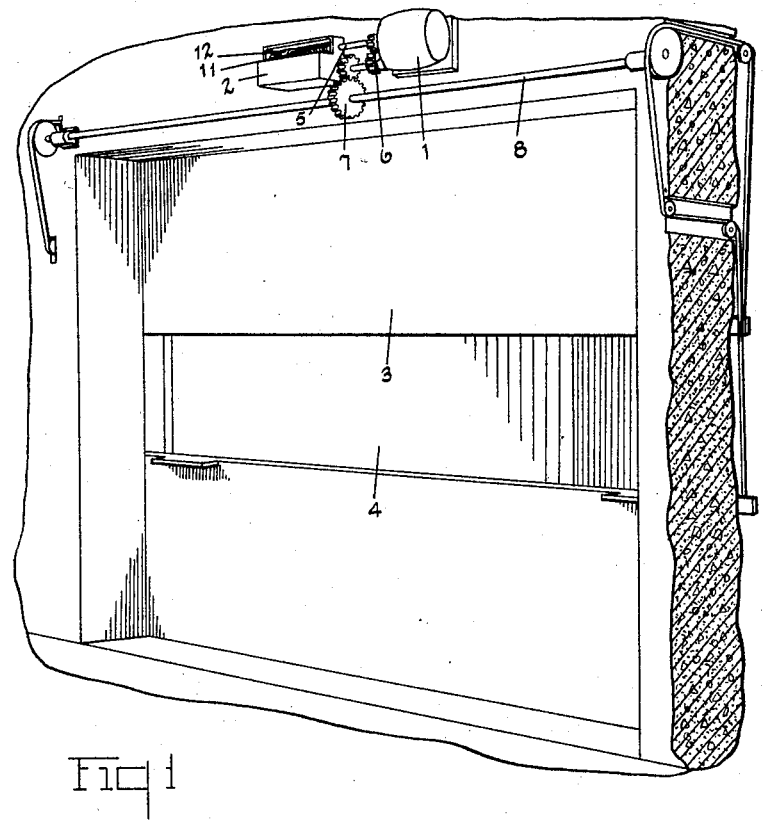
Fig. 1 illustrates a perspective view of motor and its control mechanism and of the doors that are operated thereby and which are designed to move from the point of completely closed positions to full open positions.
Figure 2:
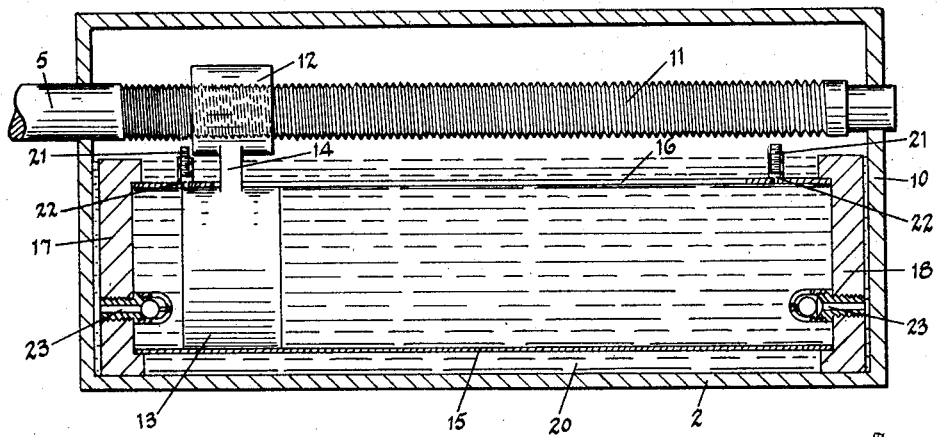
Fig. 2 is a longitudinal section of the motor speed regulator illustrated in Fig. 1.
Figure 3:
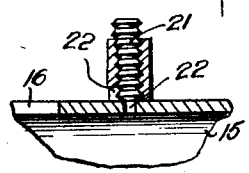
Fig. 3 illustrates an enlarged view of the outlet of the end pockets shown in Fig. 2.

The speed regulator shown in the drawings is such that it may be connected directly to the motor shaft and not to some element interposed between the motor and the thing ultimately actuated by the motor. The motor and the speed regulator may be mounted on a common base and the motor shaft may extend through, or be directly connected to, the shaft for regulating the speed of the motor at desired points in its operations. Thus the movements of the motor may be limited so as to produce limited movements or different periods of operation, according to the character of the regulator used, and as may be desired according to the purpose to which the motor and its regulator is adapted for use. Preferably, the motor is of a type that will carry the current for at least a desired period when the rotor of the motor is stationary without becoming over-heated.

As shown in the drawings, the motor 1, and its regulator 2, is mounted so that it may operate to vertically shift the doors 3 and 4 to open and close the doors. It has a shaft 5 that extends through the regulator 2. The power take-off from the shaft is at any point and may be made by the use of any mechanical element, such as by the gear wheels 6 and 7. The gear wheel 7 is connected to the shaft 8. The shaft 8 is caused to rotate by the motor 1 to shift the doors 3 and 4 vertically between the full opening and the complete closing points of the doors. Thus the shaft 8 is caused to rotate by the motor in one direction to open the doors, and in the reverse direction to close the doors.

In order that the motor 1 may reduce its speed and consequently the speed of the doors, as they approach the limits of their movements, a means is connected to the motor shaft for increasing the load placed upon the shaft. If desired, the load may be gradually increased to the point that will bring the motor to a stop when the doors have reached one or the other of their limits of travel. As shown in the drawings, the motor shaft 5 extends into the case 10. A portion of the shaft 5, located within the case 10, is threaded as at 11, and a block 12, having female thread, is reciprocably moved along the shaft 5 and in directions that change according to the direction of rotation of the shaft 5. A piston 13, located in the cylinder 15, is connected to the block 12 by an arm 14. The cylinder 15 is provided with a slot 16 through which the arm 14 extends and so that the piston 13 may be moved along the cylinder 15 by the movements of the block 12. The slot 16, preferably, terminates at points near the ends of the cylinder 15. The arm 14 is connected to a mid-point at the side of the piston and the piston has a considerable length so that portions thereof protrude considerably beyond the point of connection of the piston of the arm 14, and so that one or the other of the ends of the piston may be moved a short distance beyond one or the other ends of the slot 16. The ends of the cylinder 15 are closed by means of the cylinder heads or plates 17 and 18 and, consequently, when the ends of the pistons pass the ends of the slot 16, the material within the space between the end of the piston and the cylinder head, will be compressed which will operate to place an overload on the motor so as to bring the motor 1 to a stop. Inasmuch as the piston 13 is reciprocated by the direct and reverse rotations of the motor 1, the same extreme load will be placed on the motor upon the completion of each movement of the piston in the cylinder. The length of the threaded portion 11 and the pitch of the thread is such that the piston will operate to close one or the other of the ends of the cylinder as the doors 3 and 4 approach their extreme points of movement; that is, when they approach their full opened or their completely closed positions. The material located within the cylinder is allowed to escape, either through a suitable opening or between the piston and the cylinder at a rate that will permit the doors to slowly complete their final movements of being fully opened or completely closed. If desired, suitable means may be provided for permitting the escape of material located within the ends of the cylinder at a rate that changes progressively, or means may be provided for permitting the material to escape slowly for a period of time and then completely close the cylinder ends to prevent further escape to produce an excess load on the motor, which will first reduce its speed, and then the final load, being such that the motor cannot overcome it, will be brought to a stop.

In the form of construction shown, the lower part of the case 10 is filled with oil 20 and suitable adjustable valves 21 are located in bosses that are provided with openings for the escape of the oil that is caught in the ends of the cylinder as the ends of the pistons pass the ends of the slot 16. The oil in the ends of the cylinder will then be forced outward at the graduated rate according to the adjustment of the valves 21 and until the doors are brought against their stops or until the ends of the piston close one or the other of the openings 22, or until an automatic motor controlling switch has been opened.

In order that the piston may reciprocate, a pair of automatic valves 23 are located in the heads 8. The valves 23 may be suitable one-way valves, or clap valves, which permit the movement of the oil into the cylinder but prevent the movement of the oil out of the cylinder through the valves. The valve openings are comparatively large and, consequently, the piston can move quite freely from the ends of the cylinder, since the oil will freely flow into the ends of the cylinder through the valves 23, but when the piston approaches either end of the cylinder, the valves 23 will be closed which will subject the piston to the control of the adjustable valves 21 in its movements within the ends of the cylinder.

If desired, leakage by the piston may be used to retard the piston and, consequently, the motor, upon initial or during final movements. Such leakage will operate to control the movements of the motor in the same manner that slow movement of the oil through the passageways 22 operates to control the motor.

We claim:

1. In a motor speed regulator, a shaft rotatably connected to the motor and having a threaded portion, a piston connected to the threaded portion of the shaft, a cylinder for receiving the piston and having end pockets for entrapping a fluid material at the ends of the cylinder by the piston, the end pockets having small openings adapted to be closed on the completion of the strokes of the piston, the openings operating to permit the uniform escape of fluid material from the end portions of the cylinder when the fluid is entrapped by the piston to reduce the speed of the motor and permit movement of the motor until the openings are closed.

2. In a motor speed regulator, a shaft rotatably connected to the motor and having a threaded portion, a piston, a threaded member located on the shaft of the motor and connected to the piston, a cylinder for receiving the piston and having pockets, the cylinder having small openings adapted to be closed by the piston on the completion of the strokes of the piston, the openings operating to limit the escape of fluid material from the ends of the cylinder and the speed of the motor when the material is entrapped by the piston and for stopping the motor when the openings are closed by the piston.

3. In a motor speed regulator, a shaft rotatably connected to the motor and having a threaded portion, a piston, a cylinder having a slot, a threaded member connected to the shaft and to the piston through the slot, the ends of the cylinder having pockets for receiving the piston at the ends of the slot, the cylinder having small openings adapted to be covered and closed by the piston, the openings operating to limit the escape of fluid material from the ends of the cylinder when the material is entrapped by the piston to reduce the speed of the motor and for stopping the motor when the piston closes the openings.

4. In a motor speed regulator, a shaft rotatably connected to the motor and having a threaded portion, a piston, a cylinder having a slot, a threaded member connected to the shaft and to the piston through the slot, the ends of the cylinder having pockets for receiving the piston at the ends of the slot, the cylinder having small openings adapted to be covered and closed by the piston, the openings operating to limit the escape of fluid material from the ends of the cylinder when the material is entrapped by the piston to reduce the speed of the motor and for stopping the motor when the piston closes the openings, the ends of the cylinder having one-way valves that operate to prevent movement of the fluid material through the one-way valves when trapped by the piston and to permit free movement of the material into the ends of the cylinder when the piston moves therefrom.

In witness whereof we have hereunto signed our names to this specification.

ALBERT E. ZOLLER.
CLAUD L. FULGHUM.